(12) United States Patent
Kuboth et al.

(10) Patent No.: US 9,347,569 B2
(45) Date of Patent: May 24, 2016

(54) GATE VALVE

(71) Applicant: KSB Aktiengesellschaft, Frankenthal (DE)

(72) Inventors: Hartmut Kuboth, Pegnitz (DE); Reinhard Klimpke, Eckental (DE)

(73) Assignee: KSB Aktiengesellschaft, Frankenthal (DE)

( * ) Notice: Subject to any disclaimer, the term of this patent is extended or adjusted under 35 U.S.C. 154(b) by 0 days.

(21) Appl. No.: 14/404,136

(22) PCT Filed: May 23, 2013

(86) PCT No.: PCT/EP2013/060569
§ 371 (c)(1),
(2) Date: Nov. 26, 2014

(87) PCT Pub. No.: WO2013/178519
PCT Pub. Date: Dec. 5, 2013

(65) Prior Publication Data
US 2015/0137016 A1    May 21, 2015

(30) Foreign Application Priority Data
May 30, 2012    (DE) .......................... 10 2012 209 031

(51) Int. Cl.
*F16K 3/14* (2006.01)
*F16K 27/04* (2006.01)
*F16K 3/02* (2006.01)

(52) U.S. Cl.
CPC . *F16K 3/14* (2013.01); *F16K 3/029* (2013.01); *F16K 3/0227* (2013.01); *F16K 27/047* (2013.01)

(58) Field of Classification Search
CPC ......... F16K 3/14; F16K 3/0227; F16K 3/029; F16K 3/12; F16K 27/047

USPC ......................................... 251/176, 195–200
See application file for complete search history.

(56) References Cited

U.S. PATENT DOCUMENTS

| | | | |
|---|---|---|---|
| 1,416,431 A * | 5/1922 | Wilson | F16K 3/06 251/196 |
| 1,421,687 A * | 7/1922 | Haynes | F16K 3/0254 251/176 |

(Continued)

FOREIGN PATENT DOCUMENTS

| | | |
|---|---|---|
| DE | 1 230 279 B | 12/1966 |
| DE | 28 06 737 A1 | 8/1979 |

(Continued)

OTHER PUBLICATIONS

English-language translation of International Preliminary Report on Patentability (PCT/IB/373), including Written Opinion (PCT/ISA/237) dated Dec. 11, 2014 (Seven (7) pages).

(Continued)

*Primary Examiner* — John Bastianelli
(74) *Attorney, Agent, or Firm* — Crowell & Moring LLP

(57) ABSTRACT

A gate valve including a housing with two seat rings and two slide valve plates arranged on a plate holder and located between the seat rings. Each slide plate has a depression in which a respective pressure piece is received. The pressure pieces face one another with one pressure piece having a projection that fits in a bore of the other pressure piece. Within at least a portion of the bore a plurality of spring elements are co-axially located on the projection between the pressure pieces biasing the pressure pieces and their respective valve plates apart. The plurality of spring elements may be cup plate springs, with a first group having a spring force that is less than a spring force of a second group, and a spring deflection that is greater than a plate spring deflection of the second group.

13 Claims, 3 Drawing Sheets

(56) References Cited

U.S. PATENT DOCUMENTS

| | | | | |
|---|---|---|---|---|
| 1,783,329 | A | * | 12/1930 | Edmonds ................ F16K 3/16 251/176 |
| 1,803,889 | A | * | 5/1931 | Bohnhardt ............. F16K 3/186 251/176 |
| 1,836,374 | A | * | 12/1931 | Kelly ..................... F16K 3/184 251/176 |
| 1,869,741 | A | * | 8/1932 | Du Bois ................. F16K 3/186 251/176 |
| 2,496,452 | A | * | 2/1950 | Eichenberg ............ F16K 3/186 251/176 |
| 2,571,826 | A | | 10/1951 | Boyd |
| 3,040,773 | A | * | 6/1962 | McInerney ............... F16K 3/12 251/195 |
| 3,136,330 | A | * | 6/1964 | Dowling .............. F16K 27/047 251/176 |
| 6,845,783 | B1 | * | 1/2005 | Sheppard ................. F16K 3/18 251/195 |
| 2011/0006235 | A1 | | 1/2011 | Williams et al. |

FOREIGN PATENT DOCUMENTS

| | | |
|---|---|---|
| DE | 32 06 190 A1 | 9/1983 |
| DE | 41 17 577 A1 | 12/1992 |
| DE | 199 49 513 A1 | 4/2001 |
| WO | WO 92/21901 A1 | 12/1992 |

OTHER PUBLICATIONS

German Search Report dated May 23, 2013 with partial English-language translation (Nine (9) pages).

International Search Report (PCT/ISA/210) dated Aug. 12, 2013 with English-language translation (Six (6) pages).

* cited by examiner

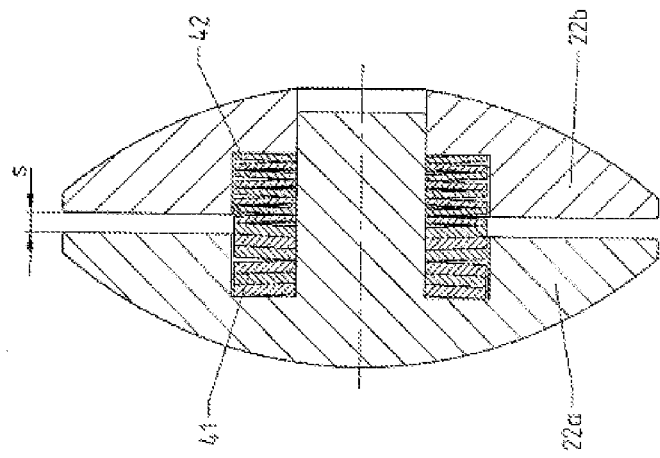
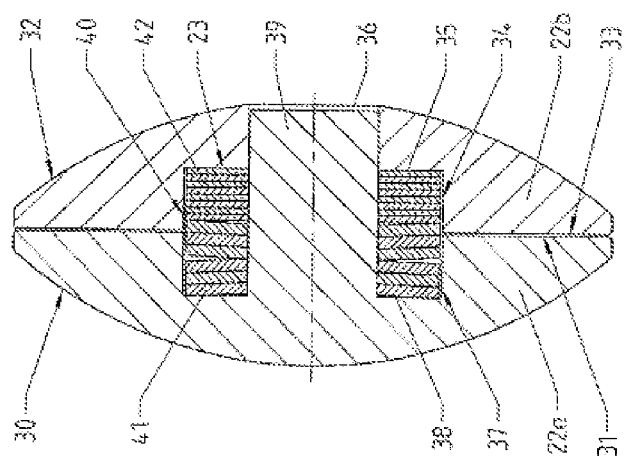

GATE VALVE

This application is a National Phase of PCT International Application No. PCT/EP/2013/060569, filed May 23, 2013, which claims priority under 35 U.S.C. §119 from German Patent Application No. 10 2012 209 031.2, filed May 30, 2012, the entire disclosures of which are expressly incorporated by reference herein.

BACKGROUND AND SUMMARY OF THE INVENTION

The invention relates to a gate valve with a housing, with two seat rings arranged in the housing and two valve plates which are arranged between the seat rings and which can be brought into bearing contact with the two seat rings via an actuating device, the valve plates being arranged on a plate holder so as to form a wedge shape.

Gate valves of this type are generally known and are employed in many sectors.

German Patent document DE 1 230 279 B discloses a gate valve with valve plates arranged in a wedge-shaped manner and connected tiltably to one another, in which the valve plates cooperating with seats in the housing are supported on the valve via a plurality of springs which are distributed over the circumference of the valve plates and which are prestressed by means of hexagon screws extending through the springs, in such a way that the valve plates come to bear against the seats only shortly before their end position is reached. A specific force and a specific travel are predetermined via the hexagon screws.

However, as a consequence, the valve plates, after being lifted off from the seat rings, may shift out of place and consequently rattle. The result of the undesirable shift of the valve plates may also be, when the valve is closed again, that the sealing faces of the seat rings or the sealing faces of the valve plates are damaged. Moreover, arranging a large number of springs over the circumference of the valve plates is highly complicated and costly. Due to the large number of springs, the orientation of the valve plates does not correspond to the ideal setting on account of the tolerances involved.

The object of the invention is to provide a cost-effective and reliably operating gate valve which is capable of sealing off both high and low differential pressures, without the gate valve being moved into a position in which the valve plates become wedged together.

The object is achieved, according to the invention, in that each valve plate has, on the side facing the other valve plate in each case, a depression in which in each case a pressure piece is arranged, each pressure piece having a recess on the side facing the other pressure piece in each case, the two recesses together forming a space which accommodates a cup spring assembly comprising a plurality of cup springs, in each case with a first spring force and with a first spring travel, and a plurality of cup springs, in each case with a second spring force and with a second spring travel, and the first spring force being higher than the second spring force and the first spring travel being shorter than the second spring travel.

By two cup spring constants being combined, one for high forces and short travels and the other for low forces and long travels, it is additionally possible, at the transfer point at which the guidance of the valve plates changes over from the seat rings to the plate holder and guide devices, for example lateral strips or a groove in the housing, to achieve a high spring force for sealing off the valve plates when differential pressures between fluid inflow side and fluid outflow side are low. The high force occurs only at the very last moment of the closing operation. Before that, the cup springs give rise to only a relatively long travel with a relatively low force. The low force also means that there is much lower friction on the seat rings and the valve plates. Moreover, the low force enables the valve plates to be locked manually in the plate holder.

In a further refinement, the pressure pieces have in each case a shape essentially in the form of a segment of a sphere, with a curved face and with a plane face lying opposite the curved face.

According to the invention, the depression formed in each of the valve plates has a shape complementary to the shape in the form of a segment of a sphere of the respective pressure piece.

By the shape of the pressure pieces being essentially in the form of a segment of a sphere and because the shape of the depression, into which the respective pressure piece is inserted, is complementary thereto, the pressure pieces are always seated in the depressions of the valve plates so as to be oriented optimally with respect to one another.

Since a bore extends from the bottom of the recess, provided on the plane face of one of the pressure pieces, to the curved face of the pressure piece, and a pin extends from the bottom of the recess, provided on the plane face of the other pressure piece, into the bore of the first-mentioned pressure piece, an optimal transmission of force from the cup spring assembly to the pressure pieces is made possible.

For an operationally reliable behavior of the wedge-type valve, the dimensions of the cup springs with the lower spring force and with the longer spring travel are designed in such a way that said cup springs can be pressed together into a block without any settling behavior.

Ideally, the spring forces of the cup springs with the high spring force are dimensioned in such a way that these act upon the end faces of the seat rings only when the gate valve is in the completely or almost completely closed position, thus resulting in much lower friction on the seat rings and the valve plates.

Advantageously, the spring forces of the cup springs are designed in such a way that the required surface pressure upon the seat is applied by means of the cup spring forces when differential pressures are low, thereby ensuring that the gate valve shuts off reliably.

Other objects, advantages and novel features of the present invention will become apparent from the following detailed description of one or more preferred embodiments when considered in conjunction with the accompanying drawings.

BRIEF DESCRIPTION OF THE DRAWINGS

FIG. 3 shows, in the form of a detail, a view of the gate valve according to FIG. 2, and FIG. 4 shows, in the form of a detail, a view of the gate valve with the valve plates in a position in which throughflow is made possible.

DETAILED DESCRIPTION

Figure 1:
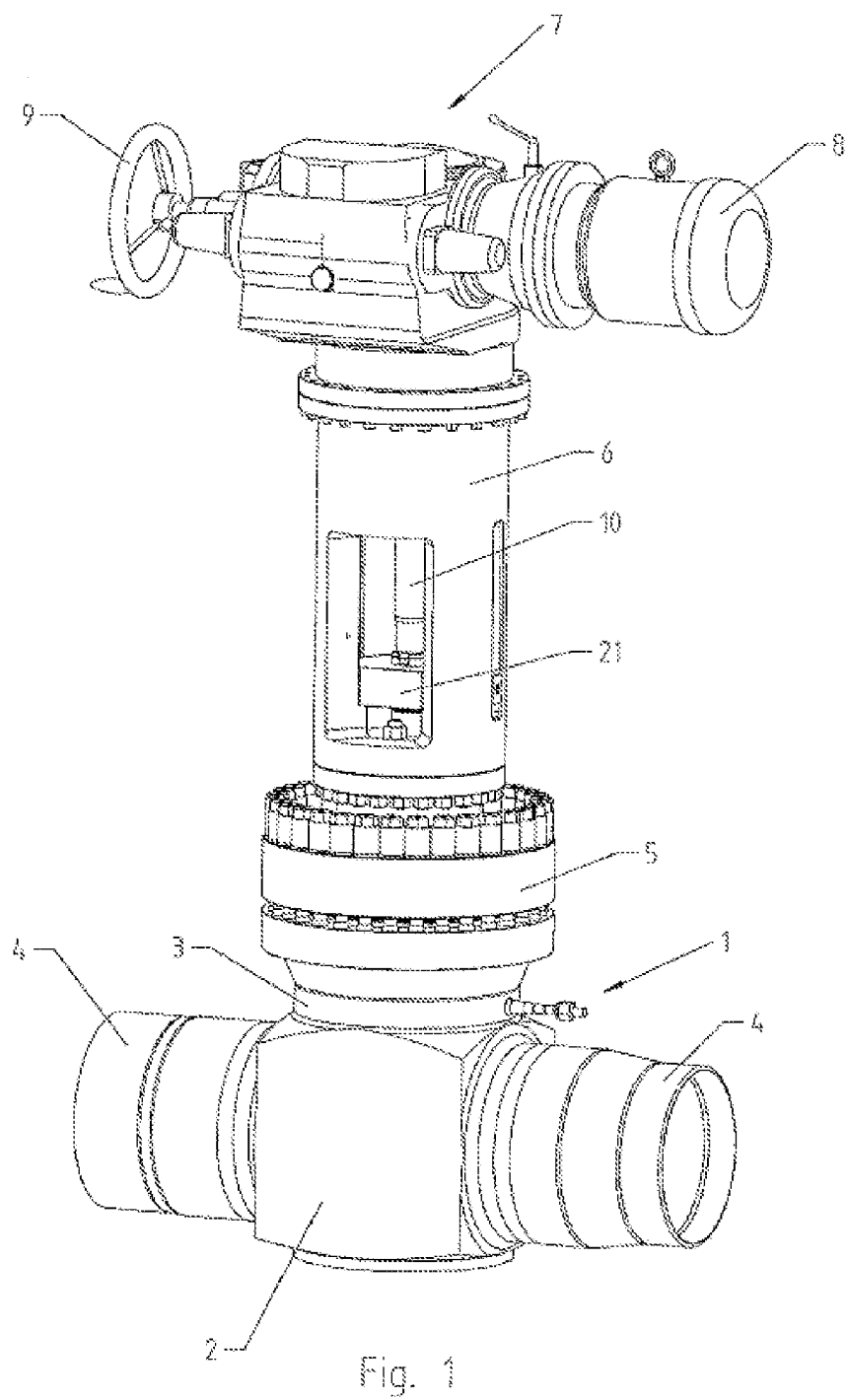
FIG. 1 shows a gate valve according to an embodiment of the invention.

FIG. 1 illustrates a gate valve for a fluid-carrying system, which has a housing 1 with an essentially angular housing portion 2 and with an essentially cylindrical housing portion 3, housing portion 2 and housing portion 3 being connected to one another in one piece. Two pipe connection pieces 4 for connection to pipe or line elements, not illustrated, are formed on the housing portion 2. In the illustration, the housing portion 3 extends upward away from the housing portion 2 at an angle of essentially 90°. The housing 1 is closed at the free end of the housing portion 3 by means of a cover 5. Fastened to the cover 5 is a shackle 6 which extends further upward and on which an actuating device 7 is mounted in turn.

Figure 2:
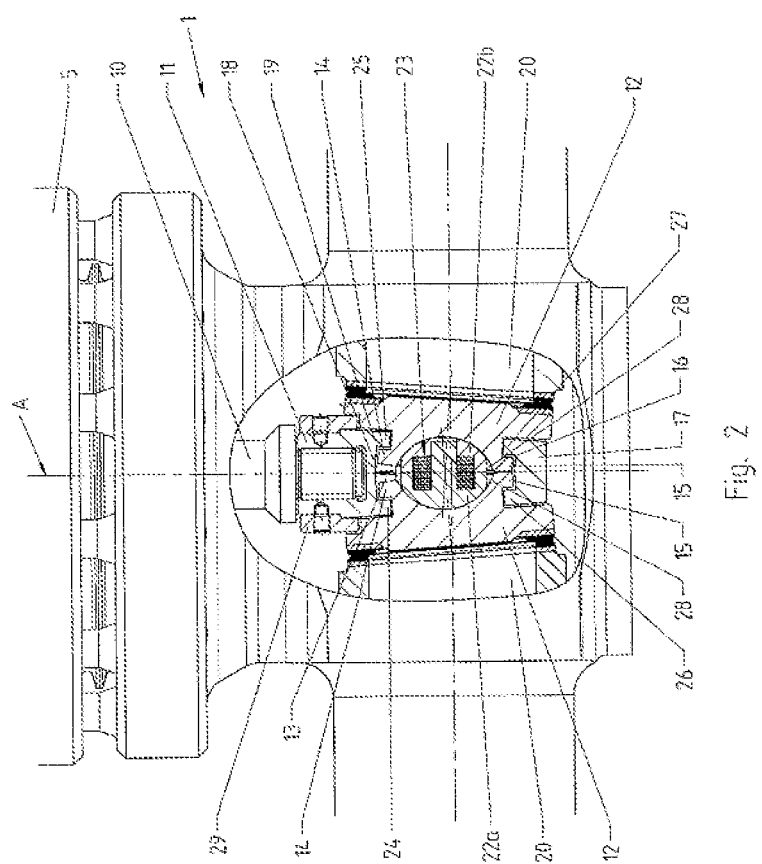
FIG. 2 shows part of the gate valve according to FIG. 1 with a cutout in the housing and with the valve plates in a position in which throughflow is prevented.

The actuating device 7, actuable by means of both an electric motor 8 and a hand wheel 9, drives a spindle 10, of which the end led into the interior of the housing 1 is shown in FIG. 2, rotatably about the axis of rotation A. The end of the spindle 10 which is located inside the housing 1 is screwed to a plate holder 11. The plate holder 11 is of essentially ring-like construction, where the upper region of the plate holder 11 connected to the spindle 10 as illustrated in the drawing, is designed to be wider than the lower region facing away from the spindle 10, so that the two end faces of the plate holder 11 run obliquely with respect to one another and to the axis of rotation A. Two valve plates 12 are arranged on the plate holder 11 in such a way that they form a wedge shape. In the present embodiment, the valve plates 12 are inserted into a recess 13 located in the plate holder 11 and extending from one end face to the other end face and are rotated in a similar way to a bayonet fastening through a specific angle, here preferably through 90°, so that projections 14 and 15 formed on the valve plates 12 are moved respectively into a clearance 16 in a lower boundary wall 17 and into a clearance 18 in an upper boundary wall 19 of the recess 13. When the actuating drive 7 is actuated, the spindle 10 pulls the valve plates 12 upward into the open position or moves the valve plates 12 into bearing contact against the free end faces of seat rings 20 arranged in the housing portion 2 and therefore into the closed position. Adjustment of a retaining piece 21 provided in the shackle 6 and shown in FIG. 1 prevents the valve from being jammed. The retaining piece 21 serves as a stop means for limiting the movement of the spindle into the housing 1. In the embodiment of the gate valve shown, the seat rings 20 are welded to that region of the pipe connection pieces 4 which terminates in the housing portion 2, but is not shown.

The two valve plates 12 installed movably in the plate holder 11 are supported on two exchangeable pressure pieces 22a, 22b. By means of a cup spring assembly 23, the two pressure pieces 22a, 22b are pressed away from one another, as a result of which, when the wedge-type valve is in the closed position, illustrated in FIG. 2, the valve plates 12 are pressed against those end faces of the seat rings 20 which face the valve plates 12. In the open position, the projections 14 and 15 are pressed against walls 24, 25, 26 and 27 formed by the clearances 16 and 18. Rattling of the valve plates 12 when these are no longer in contact with the seat rings 20 is thereby prevented. The pressure pieces 22a, 22b have a shape essentially in the form of a segment of a sphere and are arranged in complementarily formed trough-like depressions 28 in the valve plates 12, in particular on those sides of the valve plates 12 which face one another.

The valve plates 12 are secured against twisting in the plate holder 11 by means of a plate holding ring 29. In order to prevent twisting of the shut-off parts, the plate holder 11 is preferably guided by guide devices, not shown here, for example by lateral strips or at least one groove in the housing 1.

FIG. 3 shows in detail the pressure pieces 22a, 22b and also the cup spring assembly 23, with the aid of which the valve plates 12 from FIG. 2 are pressed against the seat rings 20.

The arrangement of the pressure pieces 22a, 22b corresponds to the position of the valve plates 12 which is illustrated in FIG. 2 and in which the throughflow of a fluid through the valve is prevented.

The pressure pieces 22a, 22b have a shape essentially in the form of a segment of a sphere, with a curved face 30 and with a plane face 31 lying opposite the curved face 30, in the case of pressure piece 22a, and with a curved face 32 and with a plane face 33 lying opposite the curved face 32, in the case of pressure piece 22b. As is clear from FIG. 3, even when the gate valve is closed, the pressure pieces 22a, 22b do not come into a blocked-together position, that is to say the plane faces 31 and 33 of the pressure pieces 22a, 22b do not touch one another. This prevents the valve plates 12 from being wedged together, since the valve plates 12 are always arranged elastically with respect to one another. On the plane face 33 of the pressure piece 22b, a recess 34 is provided, from the bottom 35 of which a bore 36 of reduced diameter extends to the curved face 32. On the plane face 31 of the pressure piece 22a, a recess 37 is provided, from the bottom 38 of which a pin 39 extends into the bore 36 of the pressure piece 22b. The pin 39 and the recesses 34 and 37 lying opposite one another form a space 40, in particular an annular space, in which the cup spring assembly 23 is accommodated. The pin 39 serves both for supporting the cup spring assembly 23 and for guiding the pressure pieces 22a, 22b displaceable with respect to one another. The cup spring assembly 23 comprises a plurality of cup springs 41, in each case with a first spring force and with a first spring travel, and a plurality of cup springs 42, in each case with a second spring force and with a second spring travel, the first spring force being higher than the second spring force and the first spring travel being shorter than the second spring travel. It is thereby possible that the required surface pressure upon the seat, that is to say upon the end faces of the seat rings 20, is applied by the force of the cup springs when differential pressures upon those sides of the valve plates 12 which face the pipe connection pieces 4 are low. Moreover, the dimensions of the cup springs 42 with the lower spring force and with the longer spring travel are designed in such a way that they can be pressed together into a block without any settling behavior.

FIG. 4 shows the pressure pieces 22a, 22b in the state in which they are found when the valve plates 12 are lifted off from the seat rings 20. When FIG. 4 is compared with FIG. 3, it is shown that the distance s which is covered has been implemented predominantly by the cup springs 42 and only slightly by the cup springs 41. The spring force of the cup springs 41 therefore acts upon the end faces of the seat rings 20 only when the gate valve is in the completely or almost completely closed position.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof

LIST OF REFERENCE SYMBOLS

1 Housing
2 Housing portion
3 Housing portion
4 Pipe connection piece
5 Cover
6 Shackle
7 Actuating device 8 Electric motor
9 Hand wheel
10 Spindle
11 Plate holder
12 Valve plate
13 Recess
14 Projection
15 Projection
16 Clearance
17 Boundary wall
18 Clearance
19 Boundary wall
20 Seat ring
21 Retaining piece
22a Pressure piece
22b Pressure piece
23 Cup spring assembly
24 Wall
25 Wall
26 Wall
27 Wall
28 Depression
29 Plate holding ring
30 Curved face
31 Plane face
32 Curved face
33 Plane face
34 Recess
35 Bottom
36 Bore
37 Recess
38 Bottom
39 Pin
40 Space
41 Cup spring
42 Cup spring
A Axis of rotation
s Distance

The invention claimed is:

1. A gate valve, comprising:
a valve housing having at least an inlet, an outlet and two seat rings, each seat ring associated with a respective one of the inlet and the outlet;
two valve plates;
a plate holder;
two pressure pieces; and
a spring assembly,
wherein
the two valve plates are configured to be located on the plate holder such that the two valve plates are arranged in a wedge shape,
when located on the plate holder in the wedge shape, the two valve plates are configured to shut off flow between the inlet and the outlet when the two valve plates are located between the two seat rings and in bearing contact with the two seat rings,
each of the two valve plates includes on a side facing the other valve plate a depression configured to receive one of the two pressure pieces,
each pressure piece includes a recess on a side facing the other pressure piece,
the two recesses are arranged facing one another to form a space configured to receive the cup spring assembly,
the spring assembly including a first plurality of spring elements having a first spring force and a first spring travel, and a second plurality of spring elements having a second spring force and a second spring travel, and
the first spring force is higher than the second spring force and the first spring travel is shorter than the second spring travel.

2. The gate valve as claimed in claim 1, wherein
the first and second spring elements are cup springs.

3. The gate valve as claimed in claim 2, wherein
each of the pressure pieces has a curved face on a side opposite the side facing the other pressure piece, the curved face being configured to be received in the respective valve plate depression.

4. The gate valve as claimed in claim 3, wherein
the pressure piece curved faces are substantially in the form of a segment of a sphere.

5. The gate valve as claimed in claim 4, wherein
each valve plate depression is substantially in the form of a segment of a sphere of the respective pressure piece.

6. The gate valve as claimed in claim 3, wherein
each of the pressure pieces has a substantially planar face on the side facing the other pressure piece.

7. The gate valve as claimed claim 3, wherein
a first one of the two pressure pieces includes a bore extending from the side facing the second of the two pressure pieces toward the valve plate in which the one pressure piece is received, and
the second of the two pressure pieces includes a projection extending from the side facing the first one of the two pressure pieces, the projection being configured to be received in the bore of the first pressure piece.

8. The gate valve as claimed in claim 7, wherein
the projection is in the form of a pin configured to be received in the bore and co-axially guide the cup springs within an annular region between the pin and the bore.

9. The gate valve as claimed in claim 8, wherein
within a region of the bore adjacent to the annular region receiving the cup springs the pin and the bore are sized such that the one of the pressure pieces having the bore is co-axially guided on the pin.

10. The gate valve as claimed in claim 9, wherein
dimensions of the second plurality of cup springs having the lower spring force and the longer spring travel such that said cup springs are compressible into a solid block without inelastic settling behavior.

11. The gate valve as claimed in claim 10, wherein
the first spring travel of the first plurality is such that the valve plates contact the seat rings only when the gate valve is in a completely closed position.

12. The gate valve as claimed in claim 11, wherein
the first spring travel of the first plurality is such that the valve plates contact the seat rings also when the gate valve is in a completely closed position.

13. The gate valve as claimed in claim 12, wherein
the second spring force of the second plurality of cup springs is such that the first spring force of the first plurality of cup springs is not required to maintain bearing pressure between the two valve plates and the two seat rings when the valve is in the completely closed position and a differential pressure is low.

* * * * *